(12) United States Patent
Stark (10) Patent No.: US 7,989,040 B2
(45) Date of Patent: Aug. 2, 2011

(54) INSULATING GLASS UNIT HAVING MULTI-HEIGHT INTERNAL STANDOFFS AND VISIBLE DECORATION

(75) Inventor: David H. Stark, Evergreen, CO (US)

(73) Assignee: Electronics Packaging Solutions, Inc., Evergreen, CO (US)

( * ) Notice: Subject to any disclaimer, the term of this patent is extended or adjusted under 35 U.S.C. 154(b) by 222 days.

(21) Appl. No.: 12/209,975

(22) Filed: Sep. 12, 2008

(65) Prior Publication Data

US 2009/0074997 A1    Mar. 19, 2009

Related U.S. Application Data (60) Provisional application No. 60/972,614, filed on Sep. 14, 2007.

(51) Int. Cl.
E06B 3/66 (2006.01)
E04C 2/54 (2006.01)

(52) U.S. Cl. ...... 428/34; 156/109; 52/204.59; 52/311.1; 52/786.13

(58) Field of Classification Search ............ 428/34, 428/212; 156/107, 109; 52/204.59, 311.1, 52/786.1, 786.13
See application file for complete search history.

(56) References Cited

U.S. PATENT DOCUMENTS

| | | |
|---|---|---|
| 0,049,167 A | 8/1865 | Stetson |
| 0,988,308 A | 4/1911 | Campbell |
| 1,004,257 A | 9/1911 | Higbee |
| 1,127,381 A | 2/1915 | Byrnes |
| 1,560,690 A | 11/1925 | Housekeeper |
| 2,011,557 A | 8/1935 | Anderegg |
| 2,119,009 A | 5/1938 | Elias |
| 2,177,001 A | 10/1939 | Owen |
| 2,206,558 A | 7/1940 | Bennet |
| 2,220,690 A | 11/1940 | Stupakoff |

(Continued)

FOREIGN PATENT DOCUMENTS

EP    0240584 A    10/1987

(Continued)

OTHER PUBLICATIONS

Arata et al. Pressure and Field Assisted Bonding of Glass to Aluminum; Transactions of JWRI is published by Welding Research Institute of Osaka University; vol. 13; No. 1; 1984; pp. 35-40.

(Continued)

Primary Examiner — Donald Loney
(74) Attorney, Agent, or Firm — Howison & Arnott, L.L.P.

(57) ABSTRACT

An insulating glass unit having a decorative pattern visible to the unaided eye. The glass unit comprises a pair of glass sheets disposed in a parallel, but spaced apart arrangement, thereby defining a gap between their respective inner surfaces. The glass unit further comprises a frame attached around the periphery of both sheets to form a sealed cavity. A first plurality of dots are disposed within the sealed cavity. Each dot of the first plurality is attached to the inner surface of one of the sheets, and has a height substantially equal to the width of the gap. A second plurality of dots are disposed within the sealed cavity. Each dot of the second plurality is attached to the inner surface of one of the sheets and has a height less than the width of the gap. The dots of the second plurality are arranged so as to form a pattern on the sheet that is visible to the unaided eye.

14 Claims, 5 Drawing Sheets

U.S. PATENT DOCUMENTS

| | | | |
|---|---|---|---|
| 2,730,987 | A | 1/1956 | Nelson |
| 2,756,467 | A | 7/1956 | Etling |
| 3,389,522 | A | 6/1968 | Hordis |
| 3,698,878 | A | 10/1972 | Hale et al. |
| 3,778,127 | A | 12/1973 | Langston |
| 3,778,244 | A | 12/1973 | Nedelec |
| 3,808,115 | A | 4/1974 | Manion |
| 3,828,960 | A | 8/1974 | Walles |
| 3,865,567 | A | 2/1975 | Klomp |
| 3,901,997 | A | 8/1975 | Groth |
| 3,902,883 | A | 9/1975 | Bayer |
| 3,922,705 | A | 11/1975 | Yerman |
| 3,940,898 | A | 3/1976 | Kaufman |
| 3,971,178 | A | 7/1976 | Mazzoni |
| 3,979,668 | A | 9/1976 | Samulowitz |
| 3,990,201 | A | 11/1976 | Falbel |
| 4,016,644 | A | 4/1977 | Kurtz |
| 4,047,351 | A | 9/1977 | Derner |
| 4,060,660 | A | 11/1977 | Carlson |
| 4,063,271 | A | 12/1977 | Bean et al. |
| 4,089,143 | A | 5/1978 | LaPietra |
| 4,132,218 | A | 1/1979 | Bennett |
| 4,186,725 | A | 2/1980 | Schwartz |
| 4,204,015 | A | 5/1980 | Wardlaw et al. |
| 4,261,086 | A | 4/1981 | Giachino et al. |
| 4,274,936 | A | 6/1981 | Love |
| 4,303,732 | A | 12/1981 | Torobin |
| 4,355,323 | A | 10/1982 | Kock |
| 4,357,187 | A | 11/1982 | Stanley |
| 4,427,123 | A | 1/1984 | Komeda et al. |
| 4,444,821 | A | 4/1984 | Young |
| 4,468,423 | A | 8/1984 | Hall |
| 4,486,482 | A | 12/1984 | Kobayashi |
| 4,531,511 | A | 7/1985 | Hochberg |
| 4,547,432 | A | 10/1985 | Pitts |
| 4,649,085 | A | 3/1987 | Landram |
| 4,683,154 | A | 7/1987 | Benson |
| 4,687,687 | A | 8/1987 | Terneu |
| 4,737,475 | A | 4/1988 | Thomas |
| 4,780,164 | A | 10/1988 | Rueckheim |
| 4,798,695 | A * | 1/1989 | Redel ............ 264/164 |
| 4,928,448 | A | 5/1990 | Phillip |
| 5,005,557 | A | 4/1991 | Bachli |
| 5,009,218 | A | 4/1991 | Bachli |
| 5,014,466 | A | 5/1991 | Winner |
| 5,017,252 | A | 5/1991 | Aldrich |
| 5,032,439 | A | 7/1991 | Glicksman |
| 5,085,926 | A | 2/1992 | Iida |
| 5,086,729 | A | 2/1992 | Katigiri |
| 5,107,649 | A | 4/1992 | Benson |
| 5,115,299 | A | 5/1992 | Wright |
| 5,115,612 | A | 5/1992 | Newton et al. |
| 5,118,924 | A | 6/1992 | Mehra et al. |
| 5,124,185 | A | 6/1992 | Kerr |
| 5,157,893 | A | 10/1992 | Benson et al. |
| 5,175,975 | A | 1/1993 | Benson et al. |
| 5,227,206 | A | 7/1993 | Bachli |
| 5,270,084 | A | 12/1993 | Parker |
| 5,302,414 | A | 4/1994 | Alkhimov et al. |
| 5,330,816 | A | 7/1994 | Rusek |
| 5,370,913 | A * | 12/1994 | Lin ............ 428/13 |
| 5,378,527 | A | 1/1995 | Nakanishi |
| 5,423,119 | A | 6/1995 | Yang |
| 5,433,056 | A | 7/1995 | Benson |
| 5,489,321 | A | 2/1996 | Tracy et al. |
| 5,508,092 | A | 4/1996 | Kimock |
| 5,525,430 | A | 6/1996 | Chahroudi |
| 5,582,866 | A | 12/1996 | White |
| 5,610,431 | A | 3/1997 | Martin |
| 5,625,222 | A | 4/1997 | Yoneda et al. |
| 5,643,644 | A | 7/1997 | Demars |
| 5,657,607 | A | 8/1997 | Collins et al. |
| 5,719,979 | A | 2/1998 | Furuyama |
| 5,778,629 | A | 7/1998 | Howes |
| 5,789,857 | A | 8/1998 | Ymaura |
| 5,811,926 | A | 9/1998 | Novich |
| 5,846,638 | A | 12/1998 | Meissner |
| 5,855,638 | A | 1/1999 | Demars |
| 5,856,914 | A | 1/1999 | O'Boyle |
| 5,891,536 | A | 4/1999 | Collins |
| 5,897,927 | A | 4/1999 | Tsai |
| 5,902,652 | A | 5/1999 | Collins et al. |
| 5,920,463 | A | 7/1999 | Thomas et al. |
| 5,937,611 | A | 8/1999 | Howes |
| 5,945,721 | A | 8/1999 | Tatoh |
| 5,949,655 | A | 9/1999 | Glenn |
| 5,950,398 | A | 9/1999 | Hubbard |
| 5,982,010 | A | 11/1999 | Namba et al. |
| 6,007,397 | A | 12/1999 | Ju |
| 6,020,628 | A | 2/2000 | Tower et al. |
| 6,052,965 | A | 4/2000 | Florentin |
| 6,054,195 | A | 4/2000 | Collins |
| 6,071,575 | A | 6/2000 | Collins |
| 6,083,578 | A | 7/2000 | Collins |
| 6,101,783 | A | 8/2000 | Howes |
| 6,114,804 | A | 9/2000 | Kawase |
| 6,131,410 | A | 10/2000 | Swierkowski |
| 6,139,913 | A | 10/2000 | Van Steenkiste et al. |
| 6,141,925 | A | 11/2000 | Halvorson, Jr. et al. |
| 6,168,040 | B1 | 1/2001 | Sautner et al. |
| 6,191,359 | B1 | 2/2001 | Sengupta et al. |
| 6,291,036 | B1 | 9/2001 | Wang |
| 6,352,749 | B1 | 3/2002 | Aggas |
| 6,365,242 | B1 | 4/2002 | Veerasamy |
| 6,372,312 | B1 | 4/2002 | Aggas |
| 6,383,580 | B1 | 5/2002 | Aggas |
| 6,387,460 | B1 | 5/2002 | Shukuri |
| 6,399,169 | B1 | 6/2002 | Wang |
| 6,416,375 | B1 | 7/2002 | Cho |
| 6,420,002 | B1 | 7/2002 | Aggas et al. |
| 6,436,492 | B1 | 8/2002 | Landa et al. |
| 6,444,281 | B1 | 9/2002 | Wang |
| 6,468,610 | B1 | 10/2002 | Morimoto |
| 6,478,911 | B1 | 11/2002 | Wang |
| 6,479,112 | B1 | 11/2002 | Shukuri |
| 6,497,931 | B1 | 12/2002 | Aggas |
| 6,503,583 | B2 | 1/2003 | Nalepka et al. |
| 6,506,272 | B1 | 1/2003 | Aggas |
| 6,521,988 | B2 | 2/2003 | Hauser et al. |
| 6,537,121 | B1 | 3/2003 | Baret |
| 6,538,312 | B1 | 3/2003 | Peterson et al. |
| 6,541,083 | B1 | 4/2003 | Landa et al. |
| 6,541,084 | B2 | 4/2003 | Wang |
| 6,548,895 | B1 | 4/2003 | Benavides et al. |
| 6,558,494 | B1 | 5/2003 | Wang |
| 6,627,814 | B1 | 9/2003 | Stark |
| 6,635,321 | B2 | 10/2003 | Wang et al. |
| 6,637,644 | B2 | 10/2003 | Sager et al. |
| 6,639,313 | B1 | 10/2003 | Martin et al. |
| 6,641,689 | B1 | 11/2003 | Aggas |
| 6,653,724 | B1 | 11/2003 | Kim et al. |
| 6,656,768 | B2 | 12/2003 | Thomas |
| 6,668,500 | B1 | 12/2003 | Lamberts |
| 6,692,600 | B2 | 2/2004 | Veerasamy |
| 6,696,849 | B2 | 2/2004 | Ban et al. |
| 6,701,749 | B2 | 3/2004 | Wang et al. |
| 6,723,379 | B2 | 4/2004 | Stark |
| 6,736,295 | B2 | 5/2004 | Lin et al. |
| 6,736,638 | B1 | 5/2004 | Sachdeva et al. |
| 6,759,590 | B2 | 7/2004 | Stark |
| 6,763,638 | B1 | 7/2004 | Berger, Jr. |
| 6,789,362 | B1 | 9/2004 | Hessabi |
| 6,793,990 | B1 | 9/2004 | Sakaguchi |
| 6,860,075 | B2 | 3/2005 | Sager-Hintermann et al. |
| 6,897,125 | B2 | 5/2005 | Morrow et al. |
| 6,924,974 | B2 | 8/2005 | Stark |
| 6,928,776 | B2 | 8/2005 | Hornung |
| 6,946,171 | B1 | 9/2005 | Aggas |
| 6,966,208 | B1 | 11/2005 | Collins |
| 6,974,518 | B2 | 12/2005 | Hornung |
| 7,045,181 | B2 | 5/2006 | Yoshizawa |
| 7,081,178 | B2 | 7/2006 | Collins |
| 7,100,343 | B2 | 9/2006 | France |
| 7,114,306 | B2 | 10/2006 | Minaai |
| 7,141,130 | B2 | 11/2006 | Minaai |
| 7,238,546 | B2 | 7/2007 | Stark |
| 2001/0020738 | A1 | 9/2001 | Iizima et al. |

| | | |
|---|---|---|
| 2002/0041424 A1 | 4/2002 | Lynam |
| 2002/0043046 A1 | 4/2002 | Cooper et al. |
| 2002/0113296 A1 | 8/2002 | Cho et al. |
| 2004/0104460 A1 | 6/2004 | Stark |
| 2004/0161530 A1 | 8/2004 | Stark |
| 2004/0187437 A1 | 9/2004 | Stark |
| 2004/0188124 A1 | 9/2004 | Stark |
| 2005/0067179 A1 | 3/2005 | Stark |
| 2005/0138892 A1 | 6/2005 | Misonou |
| 2005/0217319 A1 | 10/2005 | Yoshizawa |
| 2006/0187608 A1 | 8/2006 | Stark |
| 2006/0191215 A1 | 8/2006 | Stark |
| 2006/0207218 A1 | 9/2006 | Minaai et al. |

FOREIGN PATENT DOCUMENTS

| | | |
|---|---|---|
| WO | 2006121954 A | 11/2006 |

OTHER PUBLICATIONS

Carpenter Specialty Alloys: Controlled-Expansion Alloys (Catalog/Brochure); Dec. 1999; pp. 1-24 (esp. 5-8); Carpenter Technology Corporation (Publ.); Wyomissing, PA USA.

Cerjak, H. (ed.); Mathematical Modelling of Weld Phenomena 5; Diffusion Bonding of Glass to Metal in an Electrostatic Field; M. Morsy et al.; pp. 945-959; London IOM Communications, 2001.

Doron Teomim, Avner Badihi, Gil Zilber; "An innovative approach to wafer-level MEMS packaging"; Solid State Technology (Magazine); Jan. 2002; Penwell (Publ.); Nashua, NH USA.

Dunkerton; TWI Knowledge Summary Diffusion Bonding; Copyright 2001; TWI World Centre for Materials Joinging Technology Website; www.twi.co.uk; United Kingdom; 4 pages.

George S. Brady, et al., Materials Handbook, 12th Edition; 1986; pp. 28-29; McGraw-Hill Book Company; New York.

JPL Technology Reporting Office; "Hermetic Wafer Bonding by Use of Microwave Heating"; NASA Tech Brief, vol. 25, No. 5, from JPL New Technology Report NPO-20608 (NASA Contract No. NAS-7-918); May 1, 2001; Jet Propulsion Laboratory, California Institute of Technology (Publ.); Pasedena, CA, USA; including therein: NTR Inventors Report by Henry W Jackson, John D Mai, Martin B Barmatz, Nasser K Budraa, William T Pike; NASA Case No. 0205 20608; Mar. 1997(?) (Best Available Copy); including therein: (same authors) "Low Pressure and Low Temperature Hermetic Wafer Bonding Using Microwave Heating"; Jet Propulsion Laboratory, California Institute of Technology; Pasadena, CA, USA (Best Available Copy).

Kazakov et al.; Equipment for Diffusion Welding of Rectangular Glass Plates to Kovar; Svarochnoe Proizvodstvo; Jun. 1977; p. 50; (In Russian, English translation provided).

Kazakov, N. F. (ed.); Diffusion Bonding of Materials; 1981; pp. 4-9, 248-257; Pergamon Press; U.S.A.

Nicholas, M.G. & Lee, R. J.; Joining Dissimilar Materials, Metals and Materials, The Journal of the Institute of Metals, vol. 5, No. 6, Jun. 1989; UK.

NTR Inventors Report by Henry W Jackson, John D Mai, Martin B Barmatz, Nasser K Budraa, William T Pike; NASA Case No. 0205 20608; Mar. 1997(?) (Best Available Copy); Including therein: (same authors) "Low Pressure and Low Temperature Hermetic Wafer Bonding Using Microwave Heating"; Jet Propulsion Laboratory, California Institute of Technology; Pasadena, CA, USA (Best Available Copy).

Ostyn, K. & Vinckier, A.; Joining of Different Materials Through Interfaces; Interfaces in Materials, Proceedings of the Colloquium; pp. 153-173; Brussels, Dec. 1988.

PCT: International Search Report of PCT/US03/07553 (related application); International Publication No. WO 03/083938 A1; Jun. 16, 2003; 2 pgs.

PCT: International Search Report of PCT/US04/02272 (related application); International Publication No. WO 2004/068189; Jan. 27, 2004; 1 pg.

R.C. Dykhuizen et al.; Gas Dynamic Principles of Cold Spray; Journal of Thermal Spray Technology; vol. 7(2); pp. 205-212; Jun. 1998.

Sadovsky et al.; Precision Welding of Glass to Kovar Without Melting; Svarochnoe Proizvodstvo; Feb. 1973; pp. 22; (In Russian, English translation provided).

PCT: Written Opinion of the International Searching Authority of PCT/US04/02272 (related application); International Publication No. WO 2004/068189; Mar. 16, 2005; 3 pgs.

PCT: International Search Report of PCT/US05/13237 (related application); International Publication No. WO 2005/118291 A3; Oct. 24, 2006; 1 pg.

PCT: Written Opinion of the International Searching Authority of PCT/US05/13237 (related application); International Publication No. WO 2005/118291; Oct. 24, 2006; 5 pgs.

PCT: International Search Report of PCT/US06/17595; International Publication No. WO 2006/121954; Aug. 20, 2008; 3 pgs.

PCT: Written Opinion of the International Searching Authority of PCT/US06/17595; International Publication No. WO 2006/121954; Aug. 20, 2008; 10 pgs.

PCT: International Search Report of PCT/US08/76278 (related application); Jan. 16, 2009; 4 pgs.

PCT: Written Opinion of the International Searching Authority of PCT/US08/76278 (related application); Jan. 16, 2009; 5 pgs.

* cited by examiner

INSULATING GLASS UNIT HAVING MULTI-HEIGHT INTERNAL STANDOFFS AND VISIBLE DECORATION

CROSS REFERENCE TO RELATED APPLICATION

This application claims the benefit of U.S. Provisional Application for Patent Ser. No. 60/972,614, filed on Sep. 14, 2007, and entitled "INSULATING GLASS UNIT HAVING MULTI-HEIGHT INTERNAL STANDOFFS AND VISIBLE DECORATION", the specification of which is incorporated herein by reference.

TECHNICAL FIELD

The following disclosure relates to insulating glass units, and in particular, to insulating glass units for use in residential and commercial fenestration applications.

BACKGROUND

It is known to create visible patterns or images on glass sheets, including glass windowpanes, by means of glass and/or ceramic "inks," i.e., mixtures of a liquid carrier and powdered glass and/or ceramic pigments. The inks are typically applied to the glass sheets at room temperature, dried, and then fired at high temperature to fuse the pigments to the surface of the glass. The ink pattern is typically applied to the glass using a traditional silkscreen process. Recently, digital direct-on-glass (i.e., ink-jet) technology has been developed for applying glass and/or ceramic ink patterns to glass sheets by means of print heads which dispense ink while moving closely over the surface of the sheet. These print heads may use thermal dispensing, piezo-electric dispensing, or continuous dispensing technologies.

Insulating glass units (also known as insulating glazing units or IGUs) and vacuum insulating glass units (also known as vacuum insulating glazing units or VIGUs) are known comprising two parallel but spaced-apart sheets, or panes, of glass attached and/or sealed to one another around their respective peripheries, often by means of a frame. The gap between the sheets defines a cavity. In IGUs, the cavity is filled with air or other gasses such as argon, krypton or xenon whereas in VIGUs, the gap is "filled" with a reduced pressure atmosphere or a vacuum. Spacers are typically disposed within the gap of IGUs and VIGUs to maintain the gap. In the case of VIGUs, spacers are particularly necessary in order to support the sheets against the pressure of the outside air, which otherwise might distort or damage the glass, or cause the two panes of glass to come in contact with each other so as to produce a thermal "short circuit" (i.e., a thermally conductive path directly through the panes).

SUMMARY

In one aspect thereof, an insulating glass unit having a decorative pattern visible to the unaided eye is disclosed. The glass unit comprises a pair of glass sheets having inner and outer surfaces. The sheets are disposed in a parallel but-spaced apart arrangement, thereby defining a gap between their respective inner surfaces. The gap has a predetermined width. The glass unit further comprises a frame attached around the periphery of both sheets to isolate the gap from the environment and form a sealed cavity. The sealed cavity is filled with a gas. A first plurality of dots are disposed within the sealed cavity. Each dot of the first plurality is attached to the inner surface of one of the sheets, and has a height substantially equal to the width of the gap. A second plurality of dots are disposed within the sealed cavity. Each dot of the second plurality is attached to the inner surface of one of the sheets and has a height less than the width of the gap. The dots of the second plurality are arranged so as to form a pattern on the sheet that is visible to the unaided eye.

In another aspect thereof, a vacuum insulating glass unit having a decorative pattern visible to the unaided eye is disclosed. The glass unit comprises a pair of glass sheets having inner and outer surfaces. The sheets are disposed in a parallel but-spaced apart arrangement, thereby defining a gap between their respective inner surfaces. The gap has a predetermined width. The glass unit further comprises a frame attached around the periphery of both sheets to isolate the gap from the environment and form a sealed cavity. The sealed cavity contains a vacuum. A first plurality of dots are disposed within the sealed cavity. Each dot of the first plurality is attached to the inner surface of one of the sheets, and has a height substantially equal to the width of the gap. A second plurality of dots are disposed within the sealed cavity. Each dot of the second plurality is attached to the inner surface of one of the sheets and has a height less than the width of the gap. The dots of the second plurality are arranged so as to form a pattern on the sheet that is visible to the unaided eye.

In another aspect, a method of producing an insulating glass unit or a vacuum insulating glass unit is provided.

BRIEF DESCRIPTION OF THE DRAWINGS

For a more complete understanding, reference is now made to the following description taken in conjunction with the accompanying Drawings in which.

DETAILED DESCRIPTION

Figure 1:
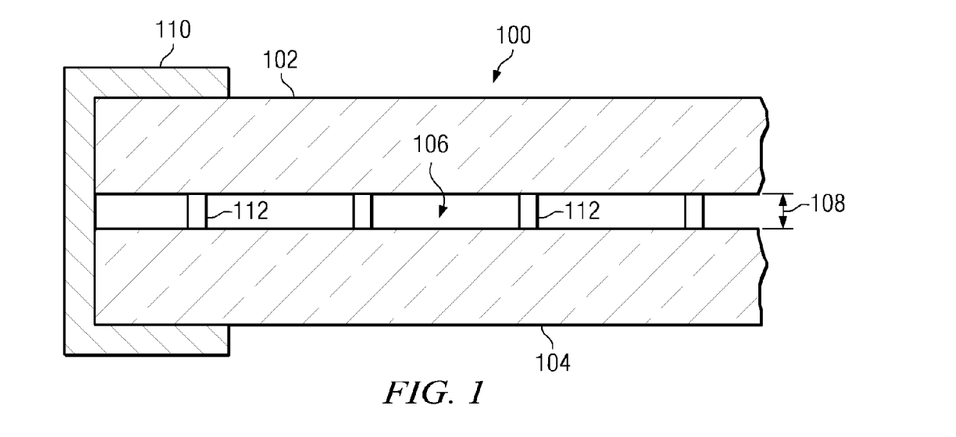
FIG. 1 is a side cross-sectional view of a portion of an IGU/VIGU in accordance with the disclosure.

Referring now to FIG. 1, there is illustrated an IGU/VIGU in accordance with the disclosure. The IGU/VIGU may actually be an insulating glass unit containing a gas in the cavity or it may be a vacuum insulating glass unit, however, since the structure of these devices is substantially similar except for the content of the cavity, for the purposes of this disclosure, they will be referred to collectively as an IGU/VIGU. The IGU/VIGU 100 includes a top sheet 102 and a bottom sheet 104, each having inner and outer surfaces. Sheets 102, 104 are disposed in a parallel but spaced-apart arrangement defining a gap 106 between their respective inner surfaces. Gap 106 has a predetermined height (denoted 108). A frame 110 is attached around the periphery of both sheets to isolate the gap from the environment and form a sealed cavity. A plurality of standoffs 112 are disposed between the inner surfaces of the sheets 102, 104. It will appreciated that the standoffs 112 support the sheets 102, 104 against outside air pressure which may otherwise distort or break the windows if a vacuum is created in cavity 106.

Figure 2:
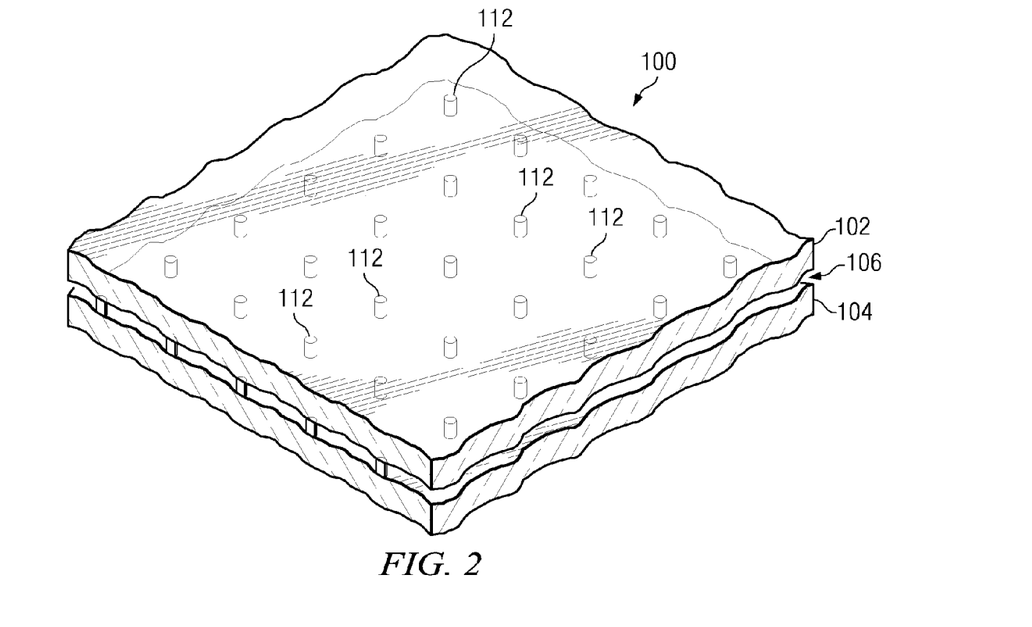
FIG. 2 is a perspective view of a portion of an IGU/VIGU along the standoffs arrayed between the panes.

Referring now to FIG. 2, there is illustrated a perspective view of a portion of the insulating glass unit 100 showing how the standoffs 112 are arrayed throughout the gap 106 so as to provide even support across the entire expanse of the glass sheets 102, 104. In the illustrated embodiment, the standoffs 112 are disposed in an evenly-spaced grid, however, the specific arrangements of standoffs is not important. Rather, the number, spacing and arrangement of the standoffs 112 must merely be sufficient to keep the localized stress on the sheets 102, 104 within acceptable limits to prevent breakage of the sheets. In addition, the total cross-sectional area of the standoffs 112 must be sufficient to withstand crushing of the standoffs from external loads (e.g., from external atmospheric pressure).

Figure 3:
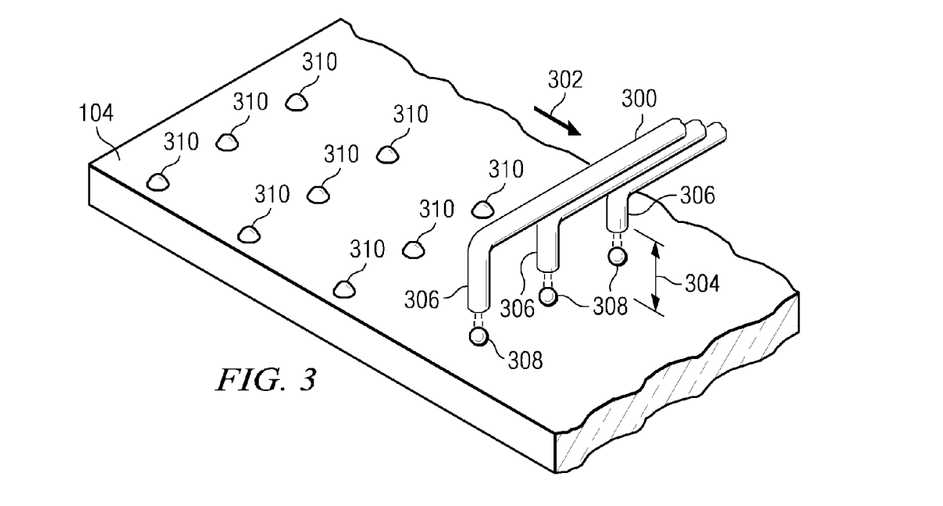
FIG. 3 illustrates ink dots being applied to the surface of a pane using an ink jet print head.

Referring now to FIG. 3, there is illustrated one method by which standoffs 112 may be formed on the surface of the glass sheet using ink jet technology. An ink jet print head 300 is shown moving, denoted by arrow 302, across the surface of a glass sheet 104 at a height 304. The print head 300 may have multiple nozzles 306 which may be arrayed perpendicular and/or parallel to the direction of travel 302. In the illustrated example, the nozzles 306 are arranged perpendicular to the direction of travel. As the print head 300 moves across the surface of glass sheet 104, droplets 308 of ink are dispensed periodically on to the glass sheet. The ink may comprise ceramic, enamel, glass or other materials that may be solidified and permanently affixed to the sheet, either immediately after deposition or after further processing. The droplets 308 adhere sufficiently to the surface of the sheet 104 to form dots 310 at desired points on the sheet. It will be understood that ink jet technology may allow dispensing of droplets in essentially any pattern desired and may include multiple colors of inks dispensed from a single print head such that colored patterns may be produced with a single pass. In addition, transparent inks created from glass, enamel, ceramic or other materials without colored pigments may be dispensed to form transparent dots 310. After dispensing onto the surface of the sheet 104, the dots 310 may be dried either by air drying, heating in an oven, IR heating, UV curing, laser or other means. It will be understood that the term drying includes conventional drying and curing by means of UV exposure or other catalysts. A dot is considered dry when it does not significantly deform if touched by another dot or other object.

Figure 4A:
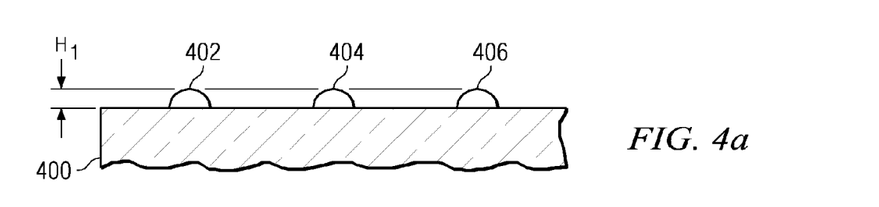
FIGS. 4a-4c illustrate stacking of multiple ink dots to form ink dots having variable height.
Figure 4B:
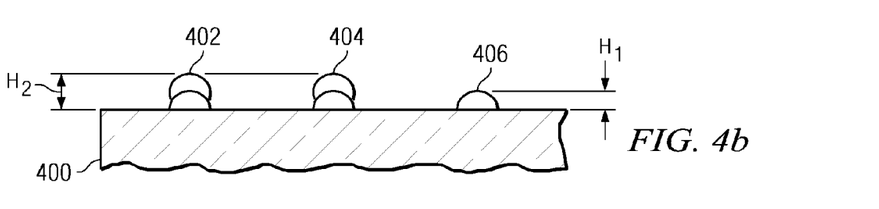
Figure 4C:
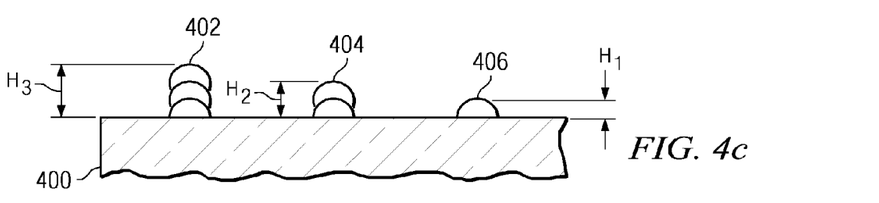

Referring now to FIGS. 4a-4c, there is illustrated a method of creating variable-height dots. FIG. 4a shows sheet 400 having three ink dots 402, 404, and 406 applied thereon as previously described. It will be appreciated that all of these dots have the same height, denoted H1, above the surface of the sheet. After dispensing, the dots will be dried, although not necessarily fused to the surface of the glass. FIG. 4b shows the sheet 400 after another pass of the print head which has dispensed another droplet of ink on dot 402 and dot 404, but not on dot 406. As a result, dots 402 and 404 now have an increased height, denoted H2, while dot 406 remains at height H1. The dots will again be dried. FIG. 4c shows the sheet 400 after yet another pass of the print head which has dispensed yet another ink droplet onto dot 402 only. As a result, dot 402 now has a greater height, denoted H3, dot 404 has an intermediate height H2, and dot 406 remains at the relatively low height H1. The droplets shown in FIGS. 4a-4c may all be of the same color (including transparent) or they may be formed of different ink colors on different dots or on different droplets on the same dot as desired for a particular application.

Figure 5:
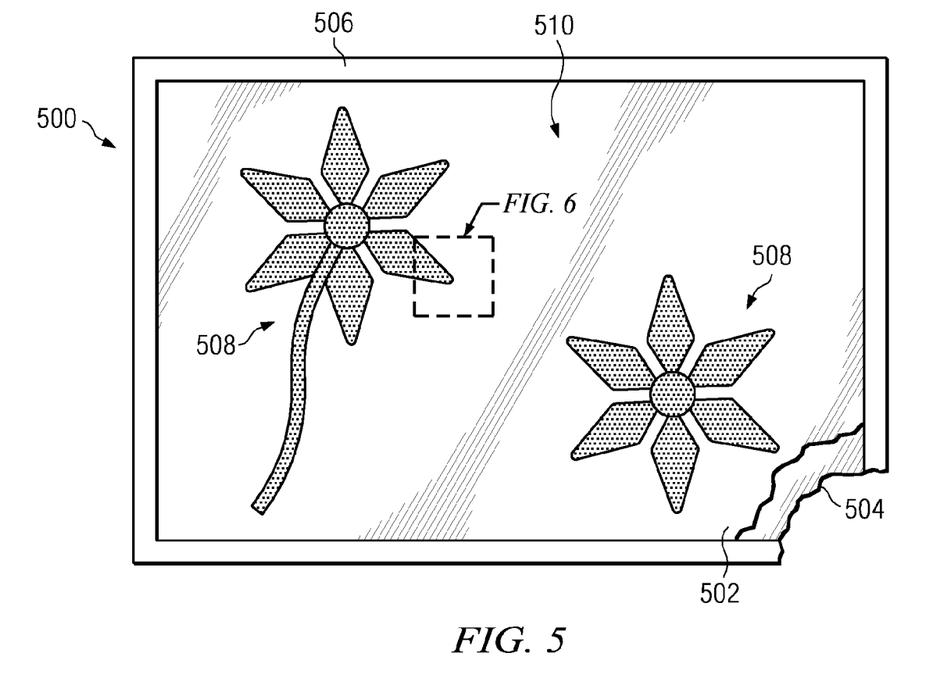
FIG. 5 is a front view of an IGU/VIGU having a visible decorative design on one of the glass panes.

Referring now to FIG. 5, there is illustrated an IGU/VIGU having a design visible to the unaided eye. IGU/VIGU 500 includes top and bottom sheets 502 and 504 respectively, and a frame 506 attached around the periphery of the sheets. One or more patterned areas 508 visible to the unaided eye appear on the glass sheets. The patterned areas 508 may be single colors or multiple colors, and they may be opaque, translucent, or transparent. The unpatterned area 510 appears essentially transparent to the unaided eye. In other words, the unpatterned area 510 will appear as ordinary window glass, which may have visible uniform tint, anti-reflective or low emissivity coatings found on conventional windows.

Figure 6:
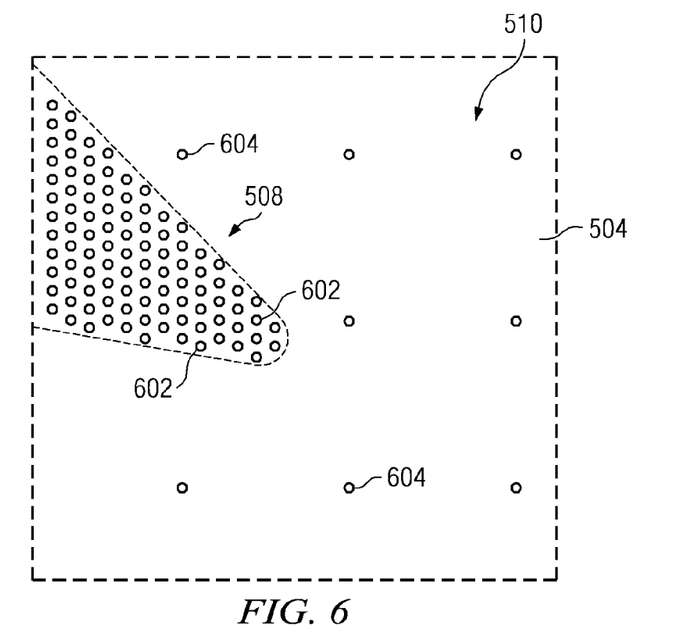
FIG. 6 is an enlarged view of the portion of IGU/VIGU designated in FIG. 5.

Referring now to FIG. 6, there is illustrated an enlarged portion of the IGU/VIGU 500 as indicated by the dotted area of FIG. 5. The patterned area 508 can now be seen to comprise a plurality of dots 602, which, although very small individually, are disposed with sufficient density to be collectively visible to the unaided eye. Outside of the patterned area 508, the unpatterned area 510 comprises a second plurality of dots 604 which are intended to be invisible or nearly invisible to the unaided eye from a typical viewing distance. The dots 604 of the second plurality are preferably formed of transparent material, but may be formed of colored or opaque material if the diameter is small enough. In addition, the dots 604 of the second plurality will typically be spaced as far apart from one another as possible while still providing the necessary support to prevent bending or breaking of the sheets and to avoid crushing of the dots.

Figure 7:
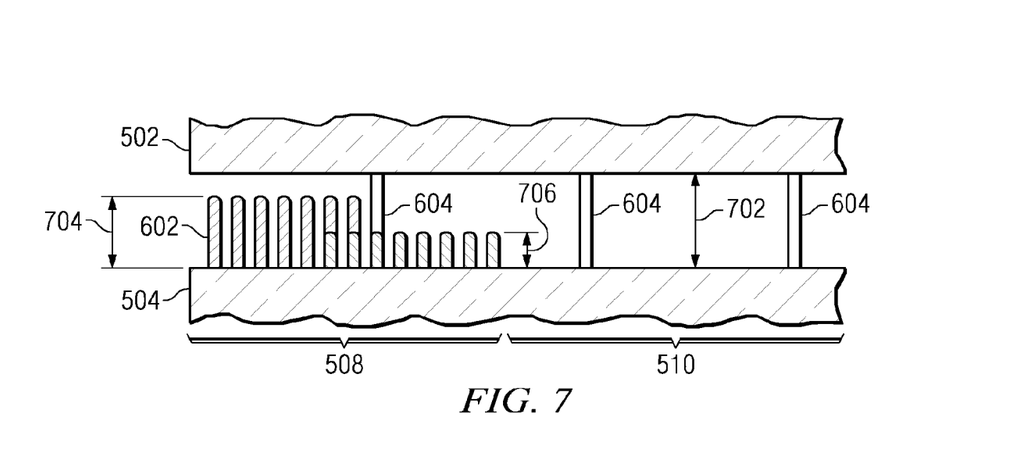
FIG. 7 is a side cross-section view of the portion of the IGU/VIGU of FIG. 6.

Referring now to FIG. 7, there is illustrated a side cross-sectional view of the IGU/VIGU shown in FIG. 6. Note: for purposes of illustration, the vertical scale has been greatly exaggerated for FIG. 7, i.e., the gap between the sheets would actually be much smaller than shown. In the patterned area 508, dots 602 of the first plurality can be seen forming the visible pattern. In the unpatterned area 510, the density of dots is much lower. Dots 604 of the second plurality have a height substantially equal to the width 702 of the gap between sheets 502 and 504. Thus, the dots 604 of the second plurality form the standoffs which actually contact both sheets of the glass to support them against outside pressure. In contrast, dots 602 of the first plurality (the pattern dots) have a height less than the width 702 of the gap. Dots 602 contact only one of the two sheets and therefore, do not provide a thermal path from the inner sheet to the outer sheet. This is extremely important in maintaining the high thermal insulating properties of the IGU/VIGU. It will be seen that the dots 602 of the first plurality may be provided in a variety of heights, as long as the range of heights is less than the width 702 of the gap such that the pattern dots 602 never contact both sheets. In the illustrated embodiment, some of the dots 602 have a relatively tall height, denoted 704, and some have a relatively low height 706. Such variation in height may be desirable to produce different levels of transparency/translucency or opacity in the pattern.

After all of the dots 602 and 604 have been applied to the desired heights, the dots must be fused, cured or dried to become solid and permanently affixed to the glass sheet. In some embodiments, fusing may be a separate step of the production process. In other embodiments, fusing may occur during other process steps, e.g., tempering. The highest dots (or stacks of dots) will become standoffs maintaining separation between sheets in the final IGU/VIGU. After fusing, it may be desirable to planarize the standoffs to ensure that they have the same height before assembly of the IGU/VIGU. The sheet having the decorative pattern and standoffs is then assembled with the other sheet and the frame, sealed, and then filled with a gas or evacuated, as the case may be.

Figure 8:
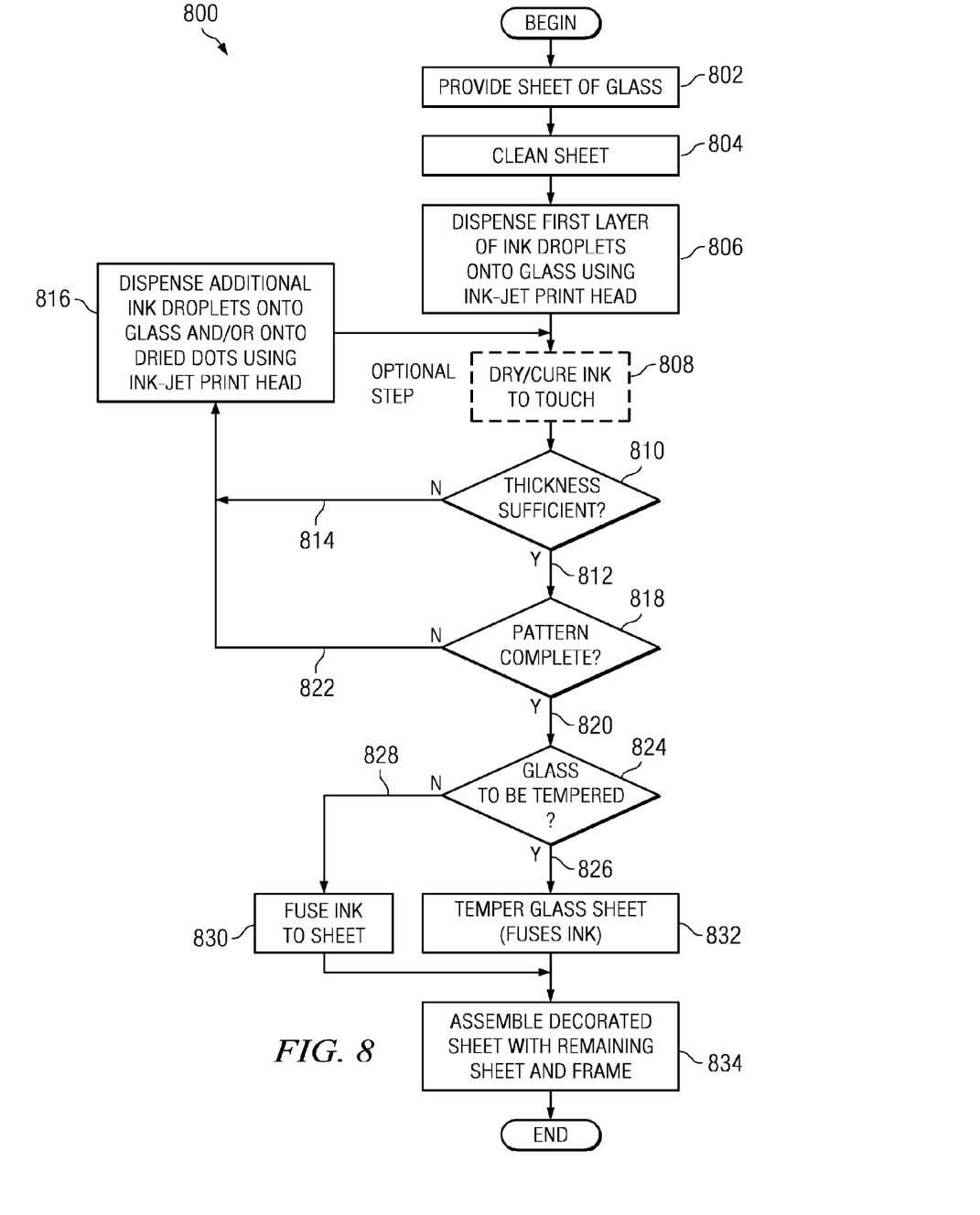
FIG. 8 is a flow chart illustrating a method of producing an IGU/VIGU having a pattern visible to the unaided eye.

Referring now to FIG. 8, a flowchart is provided illustrating one process for production of an IGU/VIGU in accordance with another embodiment. The process 800 includes a number of steps as follows: first, a sheet or pane of glass is provided as shown in block 802. Next, the sheet is cleaned as shown in block 804 to prepare the surface for application of the ink droplets (i.e., dots). The cleaning step 804 may include washing the sheet with water, detergents, solvents or other cleaners, rinsing the sheet to remove the cleaning agents and debris, drying the sheet and any other surface treatments necessary to prepare the surface of the sheet for application of the ink droplets. Next, as shown in block 806, the first layer of ink droplets is dispensed onto the sheet of glass using an ink jet print head. After the droplets are dispensed onto the glass, in some embodiments the ink droplets will be dried or cured to a solid or semi-solid state as indicated in block 808. In some of these embodiments, the drying or curing may be accomplished on a drop-by-drop basis, for example, through the use of a laser, ultraviolet, hot air or other processes applied to each drop after deposition. In other of these embodiments, the ink droplets will be dried or cured en mass after deposition of the entire first layer. In still other embodiments, the ink droplets are not dried prior to application of subsequent layers, thus making block 808 an optional step.

Following the dispensing of the first layer of ink droplets (and drying or curing if applicable), it is determined whether the droplet thickness is sufficient as shown in block 810. If the thickness is sufficient, the process continues down branch 812 to block 818, whereas if the thickness is not sufficient, the process continues down path 814 to block 816. In block 816, additional ink droplets are dispensed onto the previously applied dots using an ink jet print head. As described, the previously applied dots may be dried or cured to touch, or they may still be in liquid form. The process now continues back to optional block 808, in which the newly dispensed droplets may be dried or cured as previously described. The process then continues to block 810 where it is determined whether the layers of droplets/dots have achieved a sufficient thickness. If not, the process will take as many iterations along path 814 and block 816 until sufficient thickness is achieved.

When the droplets or stacks of droplets have reached sufficient thickness, the process moves down path 812 to block 818, wherein it is determined whether the dot pattern is now complete. If the dot pattern is complete, the process continues down path 820 to block 824. If the pattern is not complete, the process proceeds down path 822 back to block 816, wherein additional ink droplets are applied onto other portions of the glass to expand the pattern. After these additional dots have been applied, the process continues back to optional step 808 wherein the newly applied droplets may be dried or cured. The process then continues to block 810 wherein the newly applied dots of the expanded pattern are checked for sufficient thickness. If the thickness is insufficient, the process will continue back along path 814 to block 816, where additional ink droplets are dispensed onto the expanded pattern droplets as required until sufficient thickness is obtained as measured in block 810. Once a sufficient thickness of these expanded pattern droplets is achieved, the process will continue down path 812 to block 818, in which it will again be determined whether the pattern is complete. If the pattern is not complete, the process will continue to iterate through blocks 816, 808, 810 and 818 until the pattern is complete and all dots or dot stacks have achieved sufficient thickness. Once the pattern is complete and all thicknesses are sufficient, the process will continue down branch 820 to block 824. In block 824, it is determined whether the glass sheet is to be tempered. If the glass is to be tempered, the process proceeds along path 826 to block 832. In block 832, the glass sheet is tempered by heating, which may fuse the ink droplets onto the sheet making them both solid and permanently attached to the glass sheet. Returning to block 824, if the glass sheet is not to be tempered, the process proceeds down path 828 to block 830, wherein the ink is "fused" to the sheet in a separate step, rather than relying on the tempering unit to provide the fusing. It will be appreciated that in the context of process 800, the terms "fuse" and "fusing" will be understood to mean any process which causes the ink droplets to become solid and permanently attached to the glass sheet. These "fusing" operations may include actual fusing (i.e., welding) through high temperatures but may also include other high or low temperature processes such as a curing, chemical drying or bonding that serve to make the ink droplets both solid and permanently affixed to the glass sheet. Following step 830 or 832, as applicable, the process proceeds to block 834, wherein the decorated sheet is assembled with the remaining sheet and the frame as required to create an IGU/VIGU as previously described.

Although the preferred embodiment has been described in detail, it should be understood that various changes, substitutions and alterations can be made therein without departing from the spirit and scope of the invention as defined by the appended claims.

What is claimed is:

1. An insulating glass unit having a decorative pattern visible to the unaided eye, the glass unit comprising:
   a pair of glass sheets having inner and outer surfaces, the sheets disposed in a parallel, but spaced apart arrangement, defining a gap between their respective inner surfaces, the gap having a predetermined width;
   a frame attached around the periphery of both sheets to isolate the gap from the exterior environment thereby forming a sealed cavity, the sealed cavity being filled with a gas;
   a first plurality of dots, each dot of the first plurality being fixedly attached to the inner surface of one of the sheets, and having, prior to the placement of the other sheet, a height substantially equal to the width of the gap such that each dot touches, but is not fixedly attached to, the inner surface of the other sheet after placement of the other sheet;
   a second plurality of dots, each dot of the second plurality being attached to the inner surface of one of the sheets and having a height less than the width of the gap, the dots of the second plurality being arranged so as to form a pattern on the sheet that is visible to the unaided eye.

2. An insulating glass unit in accordance with claim 1, wherein the dots of the first plurality are formed of a transparent material.

3. An insulating glass unit in accordance with claim 1, wherein the dots of the second plurality are formed of a translucent material and have a range of heights yielding a range of opacity when viewed.

4. An insulating glass unit in accordance with claim 1, wherein the dots of the first plurality and the dots of the second plurality are applied on the sheet during a single pass of an ink jet print head.

5. A vacuum insulating glass unit having a decorative pattern visible to the unaided eye, the glass unit comprising:
   a pair of glass sheets having inner and outer surfaces, the sheets disposed in a parallel, but spaced apart arrangement, defining a gap between their respective inner surfaces, the gap having a predetermined width;

a frame attached around the periphery of both sheets to isolate the gap from the exterior environment thereby forming a sealed cavity, the sealed cavity containing a vacuum;

a first plurality of dots, each dot of the first plurality being fixedly attached to the inner surface of one of the sheets, and having, prior to the placement of the other sheet, a height substantially equal to the width of the gap such that each dot touches, but is not fixedly attached to, the inner surface of the other sheet after placement of the other sheet;

a second plurality of dots, each dot of the second plurality being attached to the inner surface of one of the sheets and having a height less than the width of the gap, the dots of the second plurality being arranged so as to form a pattern on the sheet that is visible to the unaided eye.

6. A vacuum insulating glass unit in accordance with claim 5, wherein the dots of the first plurality are formed of a transparent material.

7. A vacuum insulating glass unit in accordance with claim 5, wherein the dots of the second plurality are formed of a translucent material and have a range of heights yielding a range of opacity when viewed.

8. A vacuum insulating glass unit in accordance with claim 5, wherein the dots of the first plurality and the dots of the second plurality are applied on the sheet during a single pass of an ink jet print head.

9. A vacuum insulating glass unit in accordance with claim 5, wherein the vacuum is a partial vacuum.

10. A vacuum insulating glass unit in accordance with claim 5, wherein the vacuum is a complete vacuum.

11. A method of making an insulating glass unit or a vacuum insulating glass unit including a pair of glass sheets disposed in a spaced apart arrangement defining a gap of predetermined width therebetween and with a decorative pattern visible to the unaided eye between the glass sheets, the method comprising the following steps:

providing a pair of glass sheets having inner and outer surfaces;

applying a first plurality of dots to the inner surface of one of the sheets, each dot of the first plurality being fixedly attached to the inner surface and having a height substantially equal to the predetermined width of the gap;

applying a second plurality of dots to the inner surface of one of the sheets so as to form a pattern on the sheet that is visible to the unaided eye, each dot of the second plurality having a height less than the predetermined width of the gap;

providing a frame attached around the periphery of both sheets to hold the sheets in a spaced apart arrangement and isolate the gap from the exterior environment thereby forming a sealed cavity, the sealed cavity containing one of a gas and a vacuum;

whereby the dots in the first plurality touch, but are not fixedly attached to, the inner surface of the other sheet after placement of the other sheet.

12. A method of making an insulating glass unit or a vacuum insulating glass unit in accordance with claim 11, wherein the dots of the first plurality are formed of a transparent material.

13. A method of making an insulating glass unit or a vacuum insulating glass unit in accordance with claim 11, wherein the dots of the second plurality are formed of a translucent material and have a range of heights yielding a range of opacity when viewed.

14. A method of making an insulating glass unit or a vacuum insulating glass unit in accordance with claim 11, wherein the dots of the first plurality do not significantly deform from their original configuration after the sheets are placed in the spaced apart arrangement.

* * * * *

UNITED STATES PATENT AND TRADEMARK OFFICE
CERTIFICATE OF CORRECTION

| | | |
|---|---|---|
| PATENT NO. | : 7,989,040 B2 | Page 1 of 1 |
| APPLICATION NO. | : 12/209975 | |
| DATED | : August 2, 2011 | |
| INVENTOR(S) | : David H. Stark | |

It is certified that error appears in the above-identified patent and that said Letters Patent is hereby corrected as shown below:

Col. 1, line 14, please insert the following paragraph: --This Invention was made with government support under Contract No. DE-FC26-06NT42765 awarded by the Department of Energy. The Government has certain rights in this invention.--

Signed and Sealed this
Twenty-second Day of January, 2013

David J. Kappos
*Director of the United States Patent and Trademark Office*